(12) United States Patent
Roh et al.

(10) Patent No.: US 10,897,339 B2
(45) Date of Patent: *Jan. 19, 2021

(54) METHOD OF GENERATING CHANNEL QUALITY INDICATOR ADAPTIVELY IN DOWNLINK STATUS AND USER EQUIPMENT FOR THE SAME

(71) Applicant: LG ELECTRONICS INC., Seoul (KR)

(72) Inventors: Dong Wook Roh, Seoul (KR); Bong Hoe Kim, Ansan-si (KR); Joon Kui Ahn, Seoul (KR); Yu Jin Noh, Anyang-si (KR); Dong Youn Seo, Seoul (KR); Ki Jun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,699

(22) Filed: Apr. 25, 2018

(65) Prior Publication Data

US 2018/0241534 A1    Aug. 23, 2018

Related U.S. Application Data

(63) Continuation of application No. 14/801,191, filed on Jul. 16, 2015, now Pat. No. 9,985,769, which is a
(Continued)

(30) Foreign Application Priority Data

Aug. 14, 2007   (KR) .................. 10-2007-0081708

(51) Int. Cl.
*H04L 5/00*    (2006.01)
*H04W 72/04*   (2009.01)
(Continued)

(52) U.S. Cl.
CPC ......... *H04L 5/0057* (2013.01); *H04B 7/0417* (2013.01); *H04B 7/063* (2013.01);
(Continued)

(58) Field of Classification Search
USPC .................................................. 370/329, 252
See application file for complete search history.

(56) References Cited

U.S. PATENT DOCUMENTS 5,469,471 A * 11/1995 Wheatley, III ...... H04W 52/225
                                                              370/335
7,126,996 B2   10/2006 Classon et al.
(Continued)

FOREIGN PATENT DOCUMENTS

EP   1750399   2/2007
EP   1750408   2/2007
(Continued)

OTHER PUBLICATIONS

Hyunseok Yu et al., "Transmit selection diversity technique in the MIMO-OFDM systems for HSDPA," In: Vehicular Technology Conference, 2004. VTC 2004-Spring. 2004 IEEE 59th, May 17-19, 2004, vol. 1, pp. 362-366.
(Continued)

*Primary Examiner* — Alpus Hsu
*Assistant Examiner* — Hooman Houshmand
(74) *Attorney, Agent, or Firm* — Lee Hong Degerman Kang Waimey (57) ABSTRACT

A method for generating a channel quality indicator (CQI) in a mobile communication system is presented. The method includes grouping a number of subcarriers to form at least one channel quality indicator subband for generating a channel quality indicator, and generating a channel quality indicator in each channel quality indicator subband, wherein a size of each channel quality indicator subband is depen-
(Continued)

dent on a system bandwidth value and is an integer multiple of a downlink frequency resource unit size, wherein the downlink frequency resource unit size is prescribed according to the system bandwidth value.

8 Claims, 6 Drawing Sheets

Related U.S. Application Data continuation of application No. 12/192,068, filed on Aug. 14, 2008, now Pat. No. 9,548,847.

(51) Int. Cl.
| | |
|---|---|
| *H04W 72/02* | (2009.01) |
| *H04W 72/08* | (2009.01) |
| *H04B 7/0417* | (2017.01) |
| *H04B 7/06* | (2006.01) |
| *H04L 1/00* | (2006.01) |
| *H04L 27/26* | (2006.01) |

(52) U.S. Cl.
CPC .......... *H04B 7/066* (2013.01); *H04B 7/0626* (2013.01); *H04B 7/0639* (2013.01); *H04L 1/0026* (2013.01); *H04L 1/0029* (2013.01); *H04L 5/001* (2013.01); *H04W 72/02* (2013.01); *H04W 72/0413* (2013.01); *H04W 72/085* (2013.01); *H04L 27/2601* (2013.01)

(56) References Cited

U.S. PATENT DOCUMENTS

| | | | |
|---|---|---|---|
| 7,197,281 B2 | 3/2007 | Pietraski et al. | |
| 7,502,310 B2 | 3/2009 | Hwang et al. | |
| 7,535,869 B2 | 5/2009 | Yoon et al. | |
| 8,139,474 B2 | 3/2012 | Nosley | |
| 8,301,155 B2 | 10/2012 | Ho et al. | |
| 2003/0123559 A1 | 7/2003 | Classon et al. | |
| 2004/0062192 A1 | 4/2004 | Liu et al. | |
| 2004/0081123 A1* | 4/2004 | Krishnan | H04L 1/0004 370/329 |
| 2004/0178954 A1 | 9/2004 | Vook et al. | |
| 2004/0266358 A1 | 12/2004 | Pietraski et al. | |
| 2005/0120383 A1 | 6/2005 | Ozaki et al. | |
| 2005/0128993 A1* | 6/2005 | Yu | H04B 7/061 370/342 |
| 2005/0207367 A1 | 9/2005 | Onggosanusi et al. | |
| 2005/0281226 A1* | 12/2005 | Lee | H04L 1/0026 370/329 |
| 2006/0008014 A1* | 1/2006 | Tamaki | H04L 1/0003 375/260 |
| 2006/0013328 A1 | 1/2006 | Zhang et al. | |
| 2006/0034244 A1* | 2/2006 | Huang | H04L 1/0009 370/344 |
| 2006/0072677 A1 | 4/2006 | Kwak et al. | |
| 2006/0098568 A1 | 5/2006 | Oh et al. | |
| 2006/0165188 A1* | 7/2006 | Wunder | H04L 1/0003 375/260 |
| 2006/0258303 A1* | 11/2006 | Taira | H04L 1/0618 455/101 |
| 2007/0026810 A1* | 2/2007 | Love | H04B 7/063 455/67.11 |
| 2007/0026813 A1* | 2/2007 | Khan | H04L 1/0026 455/69 |
| 2007/0060149 A1 | 3/2007 | Lim et al. | |
| 2007/0098093 A1* | 5/2007 | Kwon | H04B 7/0689 375/260 |
| 2007/0098097 A1 | 5/2007 | Khan et al. | |
| 2007/0098098 A1 | 5/2007 | Xiao et al. | |
| 2007/0155323 A1 | 7/2007 | Matsumoto et al. | |
| 2007/0171864 A1 | 7/2007 | Zhang et al. | |
| 2007/0183380 A1 | 8/2007 | Rensburg et al. | |
| 2007/0230397 A1* | 10/2007 | Sakata | H04W 72/085 370/329 |
| 2007/0232341 A1* | 10/2007 | Sakata | H04L 1/0026 455/509 |
| 2007/0253473 A1 | 11/2007 | Ishii et al. | |
| 2007/0291720 A1* | 12/2007 | Lee | H04W 24/00 370/338 |
| 2008/0013610 A1 | 1/2008 | Varadarajan et al. | |
| 2008/0019314 A1 | 1/2008 | Gorokhov et al. | |
| 2008/0043708 A1 | 2/2008 | Muharemovic et al. | |
| 2008/0080635 A1 | 4/2008 | Hugl et al. | |
| 2008/0175194 A1 | 7/2008 | Blanz et al. | |
| 2008/0187030 A1 | 8/2008 | Khan | |
| 2008/0214198 A1 | 9/2008 | Chen et al. | |
| 2008/0267058 A1* | 10/2008 | Kolding | H04L 1/0029 370/208 |
| 2009/0046647 A1 | 2/2009 | Roh et al. | |
| 2009/0147880 A1* | 6/2009 | Wennstrom | H04B 7/0634 375/267 |
| 2009/0196190 A1* | 8/2009 | Li | H04L 1/0029 370/252 |
| 2009/0196249 A1 | 8/2009 | Kawamura et al. | |
| 2009/0209261 A1* | 8/2009 | Kuri | H04L 1/0027 455/450 |
| 2009/0303952 A1 | 12/2009 | Hosokawa | |
| 2010/0177713 A1* | 7/2010 | Yoshii | H04L 1/0027 370/329 |
| 2010/0182975 A1 | 7/2010 | Malladi et al. | |
| 2012/0147846 A1 | 6/2012 | Ho et al. | |
| 2015/0326370 A1 | 11/2015 | Roh et al. | |

FOREIGN PATENT DOCUMENTS

| | | |
|---|---|---|
| EP | 1760961 | 3/2007 |
| JP | 2003-169036 | 6/2003 |
| JP | 2007-68180 | 3/2007 |
| JP | 2010-519863 | 6/2010 |
| JP | 2010-536227 | 11/2010 |
| WO | 2007/015627 | 2/2007 |
| WO | 2007072828 | 6/2007 |
| WO | 2007073121 | 6/2007 |
| WO | 2009/022811 | 2/2009 |

OTHER PUBLICATIONS

Lucent Technologies, "Comments on frequency scheduling and joint power and rate optimization for OFDM," 3GPP TSG-WG1#29, R1-02-1321, Nov. 2002, 4 pages.

NTT DoCoMo, "Physical Channels and Multiplexing in Evolved UTRA Downlink," 3GPP TSG RAN WG1 Ad Hoc on LTE, R1-050590, Jun. 2005, 24 pages.

U.S. Appl. No. 12/192,068, Office Action dated Mar. 18, 2016, 19 pages.

U.S. Appl. No. 14/801,191, Office Action dated Aug. 18, 2017, 63 pages.

* cited by examiner

FIG. 1

PRIOR ART

| Time(T) | -1 | -2 | -3 | -4 |
|---|---|---|---|---|
| Number of allocated subbands | $A_1$ | $A_2$ | $A_3$ | $A_4$ |
| Weight (optional) | $W_1$ | $W_2$ | $W_3$ | $W_4$ |

FIG. 4

Number (A) of allocated subbands
— $1^{ST}$ parameter $\propto A$
— $2^{ND}$ parameter $\propto 1/A$ Whole system bandwidth — $3^{RD}$ parameter $\propto B$

METHOD OF GENERATING CHANNEL QUALITY INDICATOR ADAPTIVELY IN DOWNLINK STATUS AND USER EQUIPMENT FOR THE SAME

CROSS-REFERENCE TO RELATED APPLICATIONS

This application is a continuation of U.S. patent application Ser. No. 14/801,191, filed on Jul. 16, 2015, now U.S. Pat. No. 9,985,769, which is continuation of U.S. patent application Ser. No. 12/192,068, filed on Aug. 14, 2008, now U.S. Pat. No. 9,548,847, which claims the benefit of earlier filing date and right of priority to Korean Patent Application No. 10-2007-0081708, filed on Aug. 14, 2007, the contents of which are all hereby incorporated by reference herein in their entirety.

BACKGROUND OF THE INVENTION

Field of the Invention

The present invention relates to a method of generating a channel quality indicator in a mobile communication system, and specifically, considering a downlink channel status to adaptively adjust the number of frequency bands for channel quality indicator measurement and a width of a frequency band for the channel quality indicator measurement in a frequency-selective channel of a mobile communication system.

Discussion of the Related Art

Generally, channel information is fed back for efficient communication. For example, downlink channel information is uploaded and uplink channel information is downloaded. This channel information is referred to as a channel quality indicator (CQI). The CQI may be generated by a variety of methods. For example, the CQI may be reported by quantizing and uploading a channel status, by calculating and uploading SINR (Signal to Interference plus Noise Ratio), or by announcing a real channel status such as MCS (modulation coding scheme) level.

The CQI is most often generated according to the MCS level. The CQI should change according to the change in the modulation scheme and the coding scheme. Therefore, at least one CQI is necessary per codeword unit.

The number of CQIs increases if a MIMO (Multiple-input Multiple-output) is applied to a system. Specifically, several codewords may be simultaneously transmitted since MIMO systems generate multi-channels using multi-antennas. Thus, several CQIs should be reported correspondingly. As such, the size of control information is proportionally increased if a plurality of CQIs are used.

Figure 1:
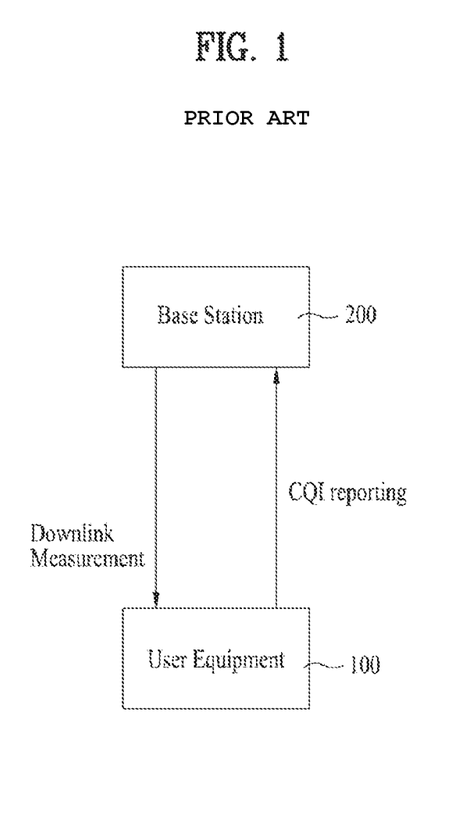
FIG. 1 illustrates a diagram for generation and transmission of CQI.

FIG. 1 illustrates a diagram for generation and transmission of CQI.

As illustrated in FIG. 1, a user equipment 100 measures a downlink quality and then reports a CQI value to a base station 200 via uplink control channel. The CQI value is selected according to the measured downlink quality.

The base station 200 may perform downlink scheduling, user equipment selection, and resource allocation, according to the reported CQI. The CQI value may include one of SINR (signal to interference and noise ratio) of a channel, CINR (carrier to interference and noise ratio), BER (bit error rate), FER (frame error rate), or a value resulting from converting one of the values above to transmittable data. In a MIMO system, information reflecting a channel status such as RI (rank information), PMI (precoding matrix information), may be added to the CQI value.

In a mobile communication system, link adaptation is used to maximize the use channel capacity of a channel. The link adaptation provides a method of adjusting MCS (modulation and coding set) and transmission power according to a given channel. The channel quality information must be fed back to a base station to enable the base station to perform the link adaptation.

Abrupt channel variation appears within a system bandwidth if a frequency band used by a system exceeds a coherence bandwidth. Specifically, in a multi-carrier system such as an orthogonal frequency division multiplexing (OFDM) system, several subcarriers exist within a given bandwidth. Since modulated symbols are transmitted via each of the subcarriers, optimal channel transmission means that channel information is carried by each subcarrier. Therefore, the size of the channel information is abruptly raised in a multi-carrier system having a plurality of subcarriers.

SUMMARY OF THE INVENTION

Accordingly, the present invention is directed to a method of generating a channel quality indicator efficiently and user equipment for the same that substantially obviate one or more problems due to limitations and disadvantages of the related art.

According to one embodiment, a method for generating a channel quality indicator (CQI) in a mobile communication system is presented. The method includes grouping a number of subcarriers to form at least one channel quality indicator subband for generating a channel quality indicator, and generating a channel quality indicator in each channel quality indicator subband, wherein a size of each channel quality indicator subband is dependent on a system bandwidth value and is an integer multiple of a downlink frequency resource unit size, wherein the downlink frequency resource unit size is prescribed according to the system bandwidth value.

In one feature wherein the integer is one of 2 and 4 depending on the system bandwidth value. Additionally, all generated channel quality indicators are transmitted to a base station. Furthermore, the method further includes selecting one channel quality indicator subband having a best channel quality, and reporting a channel quality indicator corresponding to the selected channel quality indicator subband to a base station.

In another feature, the integer is one of 1 and 2 depending on the system bandwidth value. Additionally, a generated channel quality indicator is transmitted to a base station according to a selective reporting scheme. Furthermore, the selective reporting scheme includes selecting at least one channel quality indicator subband having a high channel quality, and reporting one channel quality indicator determined from among the selected at least one channel quality indicator subband. Additionally, a number of channel quality indicator subbands selected is dependent on the size of the channel quality indicator subband and the system bandwidth value.

In yet another feature, the method further includes receiving information regarding the system bandwidth value and the downlink frequency resource unit size from a base station. Additionally, the channel quality indicator comprises a precoding matrix indicator.

In another embodiment, A mobile terminal for generating a channel quality indicator (CQI) in a mobile communication system is presented. The mobile terminal includes a setting unit grouping a number of subcarriers to form at least one channel quality indicator subband for generating a channel quality indicator, and a measuring unit generating the channel quality indicator in each channel quality indicator subband by measuring a channel quality according to the channel quality indicator subband, wherein a size of each channel quality indicator subband is dependent on a system bandwidth value and is an integer multiple of a downlink frequency resource unit size, and wherein the frequency resource unit size is prescribed according to the system bandwidth value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood that the following detailed description of the present invention is exemplary and explanatory and is intended to provide further explanation of the invention as claimed. The present invention is applicable to any communication system that requires feedback of downlink channel quality information, in addition to the 3GPP LTE system.

The following detailed description includes details to provide complete understanding of the present invention. Still, it is apparent to those skilled in the art that the present invention may be embodied without those details. Wherever possible, the same reference numbers will be used throughout the drawings to refer to the same or like parts.

As mentioned above, a method of adaptively generating CQI by considering a downlink channel status in a frequency selective channel of a mobile communication system according to one embodiment of the present invention is provided.

First, a method of modifying a unit of channel information transmission will be explained. In OFDM, several subcarriers are grouped into one subcarrier group, and channel information carried by each subcarrier is transmitted via a unit of the corresponding group. Specifically, in OFDM using 2,048 subcarriers, 12 subcarriers are grouped into a single subcarrier group to form 171 subcarrier groups. Thus, the size of transmitted channel information is reduced to 171 from 2,048.

At least one or more subcarriers are grouped into a single group to be divided into subcarrier group units if the frequency band is distinguished into the respective subcarriers like OFDM, and each CQI is then reported. A basic unit of the CQI reporting method shall be defined as a 'CQI subband'. The term 'subcarrier group' is interchangeable with the term '(CQI) subband'.

Additionally, an entire frequency band is divided into partial frequency bands if the frequency band is not distinguished into the respective subcarriers. The CQI is generated with reference to the divided frequency band. The divided frequency band for the CQI generation shall be defined as a 'CQI subband'.

For a second method, a CQI may be generated by compressing channel information. For example, channel information for each subcarrier in OFDM is compressed and transmitted using a specific compression scheme. In this example, DCT (discrete cosine transform) may be used as the compression scheme.

For a third method, a CQI may be generated by selecting a corresponding frequency band to generate channel information. For example, instead of transmitting channel information carried by each subcarrier, M subcarriers are selected from subcarriers or subcarrier group and channel information is carried by the M selected subcarriers, which is referred to as a Best-M scheme.

When CQI is transmitted by selecting a frequency band, the transmitted portion may be divided into two different parts. A first part may include a CQI value and a second part may include a CQI index.

Figure 2:
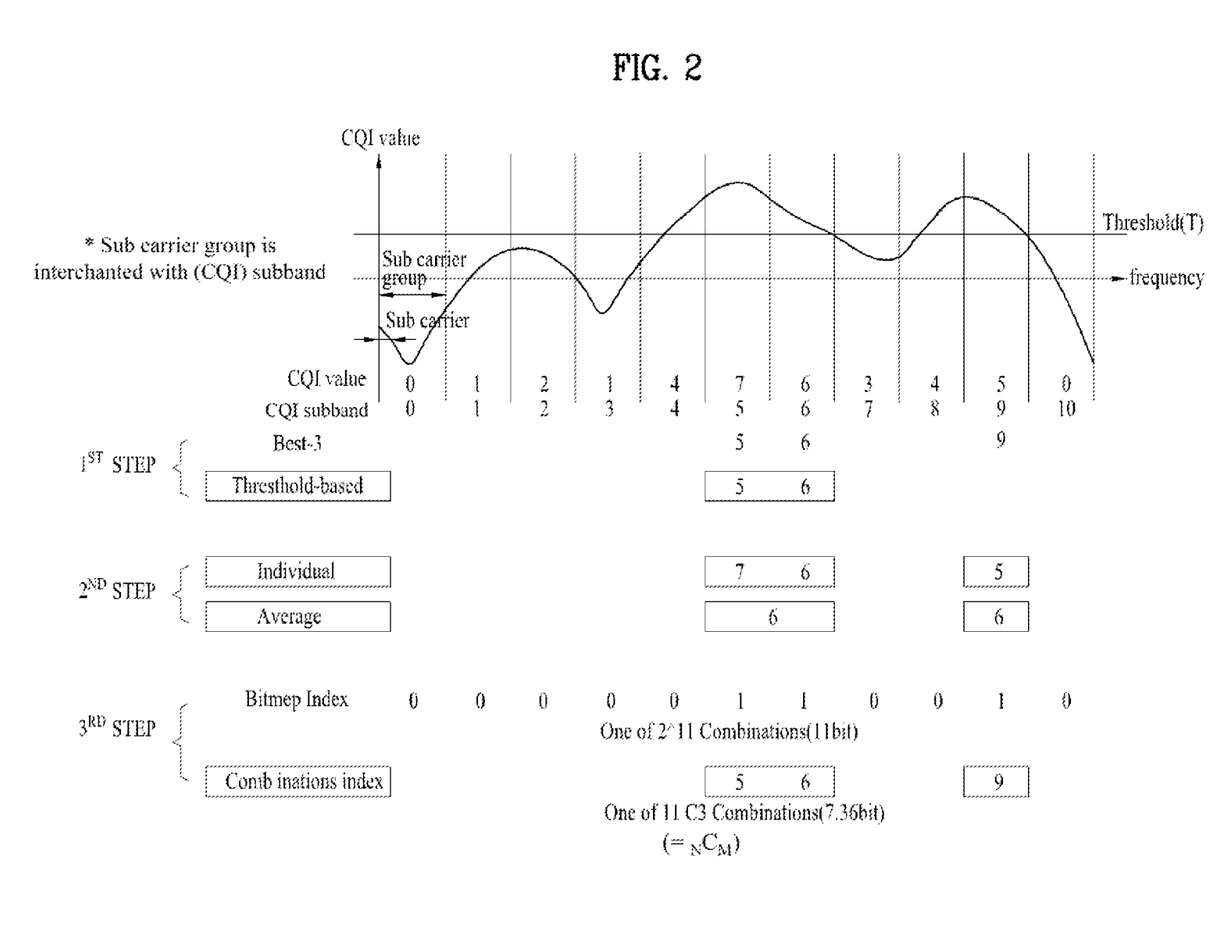
FIG. 2 illustrates a diagram for a method of generating CQI by selectively setting CQI subband in a frequency domain according to one embodiment of the present invention.

FIG. 2 illustrates a diagram for a method of generating a CQI by selectively setting a CQI subband in a frequency domain.

FIG. 2 illustrates a graph of a horizontal axis representing a frequency axis and a vertical axis representing a CQI value in each frequency domain. The horizontal axis is divided into subband units generated from grouping a plurality of subcarriers. An index is assigned to each of the subbands.

A frequency band selective CQI scheme is constructed with three parts. The first part selects a frequency band for CQI generation, such as a CQI subband. The second part manipulates, generates, and transmits the CQI values of the selected frequency bands. The third part transmits the selected frequency band, such as, indexes of the CQI subbands.

FIG. 2 illustrates the Best-M scheme and the Threshold-based scheme as examples for selecting a CQI subband for CQI generation.

The Best-M scheme is a method of selecting M CQI subbands with good channel status. As illustrated in FIG. 2, CQI subbands of indexes 5, 6 and 9, which have a good channel status, are selected with a Best-3 scheme. The Threshold-based scheme is a scheme for selecting a CQI subband having a channel status higher than a determined threshold. For example, as illustrated in FIG. 2, CQI subbands of indexes 5 and 6 are selected, since indexes 5 and 6 are higher than a threshold (T).

Additionally, FIG. 2 illustrates an individual transmission scheme and an average transmission scheme as examples for generating and transmitting CQI values in the second step.

The individual transmission scheme transmits all CQI values of CQI subbands selected in the first step. Therefore, in the individual transmission scheme, if the number of selected CQI subbands increases, the CQI values to be transmitted will also increase.

The average transmission scheme transmits the average of the CQI values of the selected CQI subbands. The average transmission scheme is advantageous because a single CQI value is transmitted regardless of the number of the selected CQI subbands. Still, the average transmission scheme is disadvantageous in that accuracy is lowered because an average of several CQI subbands is transmitted. In this example, the average is calculated via arithmetic averaging or by channel capacity averaging.

FIG. 2 illustrates an example of the CQI subbands 5, 6 and 9 selected by Best-3 in the first step for CQI generation. Additionally, CQI values of subbands 5, 6 and 9, respectively 7, 6, and 5, are selected in the second step. By arithmetically averaging CQI values of subbands 5, 6 and 9, the average of '6' is generated.

FIG. 2 illustrates the bitmap index scheme and the general combinatorial index scheme as examples for transmitting index of CQI subband in the third step.

In the bitmap index scheme, a single bit is allocated to each CQI subband. If the corresponding CQI subband is used, '1' is allocated to the bit. If the corresponding CQI subband is not used, '0' is allocated to the bit. Therefore, the bitmap index scheme may indicate which CQI subband is used. The bitmap index scheme is disadvantageous in that the number of bits equaling to the total number of CQI subbands is necessary. Still, the bitmap index scheme is advantageous in that it may be represented by the predetermined number of bits regardless of how many CQI subbands are selected to be reported.

The combinatorial index scheme determines how many CQI subbands will be used. Combinations amounting to the number of CQI subbands used among total CQI subbands are mapped to indexes, respectively. Specifically, if M CQI subband indexes among the N are used for CQI generation when total N CQI subbands exist, the total number of possible combinations may be calculated as follows.

$$_N C_M = \frac{N!}{M!(N-M)!} \quad \text{[Formula 1]}$$

The number of bits to indicate the number of cases in Formula 1 may be determined by Formula 2.

$$\lceil \log_2(_N C_M) \rceil = \left\lceil \log_2\left(\frac{N!}{M!(N-M)!}\right) \right\rceil \quad \text{[Formula 2]}$$

In the example illustrated in FIG. 2, three CQI subbands may be selected from the 11 CQI subbands. Thus, the possible number of cases is '$_{11}C_3=165$' and the bit number to indicate '165' is 8 ($2^7 \leq _{11}C_3 \leq 2^8$).

In the following description, a method of generating and transmitting CQI effectively by predicting or obtaining information on frequency band allocated to UE by a base station and using the predicted or obtained information and UE configuration for the same are explained.

According to one embodiment of the present invention, when attempting to transmit channel status information per frequency domain in frequency selective channel, an effective CQI generating method for adaptively generating CQI and UE considers the status of downlink as a size of whole frequency bands of downlink and a size of frequency band allocated to each user.

'CQI subband' refers to a unit for dividing a frequency band for CQI generation in the same manner of the above-mentioned embodiment. In an OFDM system, 'CQI subband' may include a single subcarrier or a plurality of subcarriers.

In frequency band selective CQI, each user selectively reports a channel with good status. A user may compete with several users for good channels across all channels of a base station. Thus, the base station may raise performance of an entire system using scheduling for allocating a user having a best channel status in each frequency band. In this example, allocation may be carried out by considering a balance between users for user selection.

Therefore, if a frequency band to be allocated in downlink as a result of scheduling is predictive with respect to a user, an optimal channel transmission may be achieved by only transmitting channel information on a corresponding frequency band.

Additionally, modulation and coding schemes applied to a frequency band allocated to a single user are not changed. Therefore, even if a user transmits a different channel status for each frequency band, averaged modulation and coding schemes are used identically for the transmission via an allocated frequency band in downlink. In this example, the averaging may correspond to an arithmetic average or a channel-capacity dependent average. Therefore, sending a single averaged channel information of corresponding bands becomes an optimal channel transmission if a user is able to predict a frequency band to be scheduled.

As disclosed above, the user only selects corresponding bands and then sends a single averaged channel information of the selected bands if a user is able to predict a frequency band to be allocated in downlink as a result of scheduling of a base station. This method transmits channel information optimally with a minimum size.

First, a width of a CQI subband as a unit for generating CQI transmitted in uplink is set to N. The CQI may be generated by selecting M CQI subbands via the Best-M scheme for selecting M subbands indicating a best channel value on a frequency axis or the Peak-M scheme for selecting M subbands from subbands of which channel value indicates a peak value on a frequency axis. In this example, an optimal channel information transmitting method is associated with a case that a size of frequency band allocated in downlink is N*M.

Thus, the most efficient method of reporting a downlink channel status via uplink is to report information on a frequency band, which will only be allocated to each user. Still, a problem is created where a future scheduling situation should be predicted. A frequency band, which will be scheduled in the future, depends on a users' channel status and a scheduling algorithm of a base station. Accordingly, one embodiment of the present invention describes a method for efficiently predicting information on a frequency band to be scheduled in the future.

Figure 3:
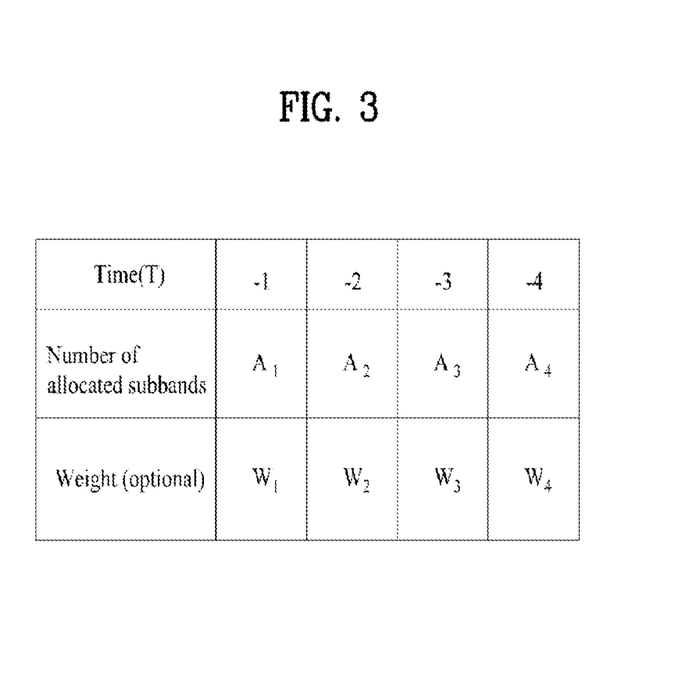
FIG. 3 illustrates a diagram for a method of adaptively determining the number (M) of subbands for CQI generation by predicting a frequency band to be allocated to a specific user equipment according to one embodiment of the present invention.

FIG. 3 illustrates a diagram to explain a method of adaptively determining the number (M) of subbands for CQI generation by predicting a frequency band to be allocated to specific user equipment according to one preferred embodiment of the present invention.

Specifically, FIG. 3 illustrates an example for a method of determining the number of subbands for CQI generation according to a prediction for a frequency band allocated to a specific UE according to one embodiment of the present invention. The number of subbands for CQI generation is determined according to a method of predicting a scheduling situation by only considering a user's channel status.

The channel status of a user changes slowly according to time. In this example, there is no big difference between a frequency band previously allocated to a user and a frequency band scheduled to be allocated to a user. Therefore, the frequency band may be predicted to be allocated via an average or a weighted average of frequency bands previously allocated to users.

Referring to FIG. 3, the numbers of subbands previously allocated to a corresponding UE by −1, −2, −3 and −4 are $A_1$, $A_2$, $A_3$ and $A_4$, respectively. The number MA of variable subbands is determined by using the values resulting from multiplying the numbers of subbands by weights $w_1$, $w_2$, $w_3$ and $w_4$, respectively. In this example, an average of the number of previously allocated subbands is used if each of the weights is set to 1.

In one embodiment of the present invention, a CQI may be generated via a method of selecting a frequency band having a width equal to that of a frequency band allocated in a previous time. Additionally, a CQI may be generated via a method of increasing/decreasing a frequency band if a previously allocated frequency band is increased/decreased greater than a further previously allocated frequency band.

In adaptively determining the number of subbands for CQI generation according to one preferred embodiment of the present invention, as mentioned above, various parameters considering fairness between UEs, entire system band width, or the number of previous subbands may be used.

This embodiment is explained with reference to FIG. 4 as follows.

Figure 4:
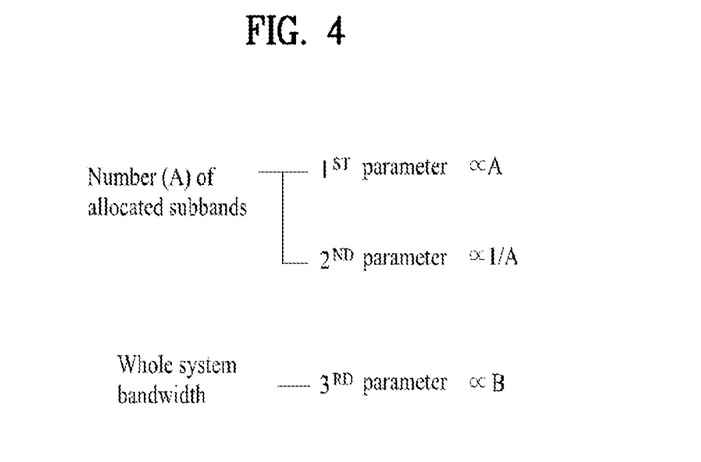
FIG. 4 illustrates a diagram for a method of adaptively determining the number (M) of subbands for CQI generation by predicting a frequency band to be allocated to a specific user equipment according to a second embodiment of the present invention.

FIG. 4 illustrates a diagram for a method of adaptively determining the number (M) of subbands for CQI generation by predicting a frequency band to be allocated to user equipment.

As illustrated in FIG. 4, a method of estimating a frequency band allocated to a corresponding UE considers fairness between UEs in addition to the number of subbands allocated to the corresponding UE. Each of the additional parameters may be provided to accurately determine the algorithm for enabling a base station to allocate frequency resources to UEs.

Referring to FIG. 4, the number of subbands allocated in previous view is set to 'A', a first parameter may be a parameter proportional to 'A'. Specifically, if the number of subbands were previously allocated to a UE due to a good channel status, it is assumed that there are a number of subbands maintaining good channel status in a next view. The first parameter uses an average or a weighted average of the numbers of subbands allocated to the respective views in a specific period.

A second parameter used in determining the number (M) of subbands for CQI generation considers fairness between UEs. The second parameter is explained in detail as follows.

First, the scheme of considering a user's channel, as illustrated in FIG. 3, is desirable when the scheduling algorithm of a base station allocates a corresponding band to a user indicating a best channel status in each frequency band. Still, other factors may be considered if the base station scheduling scheme considers fairness between users. Frequency band prediction for a user should be changed if a base station uses scheduling that considers fairness between users. If fairness is taken into consideration, the probability for a user to be allocated with more frequency bands for a next band increases as the band allocated to each user decreases. Therefore, when considering fairness between UEs, a frequency band for CQI generation is reduced if the frequency band allocated to the corresponding UE is excessive, and vice versa.

Specifically, FIG. 4 illustrates that the second parameter to consider the fairness between UEs is inverse proportional to the number 'A' of subbands allocated to a specific UE in previous view. In this example, as mentioned in the foregoing description, the number 'A' of subbands allocated to the specific UE may include an average or a weighted average of the numbers of subbands allocated to the specific UE for a prescribed period.

In the current embodiment of the present invention, when selecting 'M' as the number of subbands for CQI generation, the determination may be made by additionally considering a bandwidth (B) of the entire system. A wide entire system bandwidth most likely indicates that there may exist several areas in good channel status and several areas in poor channel status along frequencies. Therefore, it is advantageous for a value of M to be set high. However, the system may indicate a channel status in detail despite the lowered M value if the entire system bandwidth is reduced. Therefore, the system may variably modify the M value correspondingly if the system bandwidth is changed.

As illustrated in FIG. 4, a third parameter may be set proportional to the entire system bandwidth (B) and is then considered in determining the number of subbands for CQI generation.

Still, as described above, if the entire system bandwidth is not considered for a base station to allocate downlink resource in a specific system, the entire system bandwidth may not be considered in determining the number of subbands for CQI.

Moreover, the system may additionally apply MMSE (minimum Min Square Error) for minimizing error by obtaining each prediction result and error information corresponding to the prediction result when predicting a frequency resource to be allocated to each UE.

Finally, the CQI generating method according to one embodiment of the present invention may determine the number (M) of subbands for CQI generation based on frequency band to be allocated to a corresponding UE using the parameters illustrated in FIGS. 3 and 4. Additionally, the CQI generating method may apply the previously mentioned Best-M or Peak-M scheme according to the number (M) of subbands.

Additionally, the direct adjustment of the M, by the above-mentioned method may be effective for Best-M or Peak-M scheme but may not be directly applied to the threshold using scheme. However, 'M' may be applied by decreasing a threshold to consider more frequency bands when increasing M or increasing a threshold in accordance with a decreasing M.

The M value of the individual transmission scheme illustrated in FIG. 2, is unable to increase or decrease without limitation. The entire system performance is enhanced if more CQI values are sent. Still, sending more CQI values will waste most of the uplink bandwidth. Therefore, in varying the number of M, a maximum value of M is determined such that the total necessary bit number is equal to or less than a predetermined bit number. Furthermore, the value of M may be limited to be equal to or less than the maximum value.

In this example, the total necessary bit number for CQI transmission is the result of multiplying the bit number of each CQI by the number M of CQIs. Therefore, the system may consider a method of lowering bit number of each CQI and increasing M in order to set the total necessary bit number to be equal to or less than a predetermined bit number.

Another embodiment of the present invention describes a method of adaptively adjusting a width of each CQI subband as a unit for dividing a frequency band for generating each CQI. As such, the width adjustment of the CQI subband may be carried out by a base station. Alternatively, the width adjustment of the CQI subband may be determined by a UE and then reported to a base station.

Figure 5:
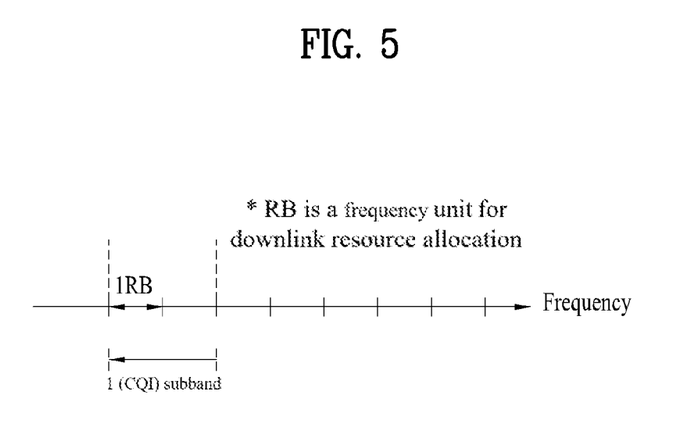
FIG. 5 illustrates a diagram for a method of setting a width of subband for CQI generation according to one embodiment of the present invention.

FIG. 5 illustrates a diagram of a method of setting a width of a subband for CQI generation according to one embodiment of the present invention.

As illustrated in FIG. 5, a width of subband for CQI generation is set to a width of a unit frequency band for allocating or reporting downlink resources or a multiplication of a unit frequency bandwidth for allocating or reporting downlink resource.

In a typical communication system, a downlink frequency band is allocated to each user and information of each user is transmitted via the allocated frequency band. In this example, frequency band is allocated to each user by binding frequency bands by a predetermined unit and reporting the frequency band allocated by the predetermined unit to the user.

Therefore, a channel status may be most efficiently announced via uplink if a generation unit of CQI band is matched to a unit of frequency band allocated or reported to each user. Specifically, a CQI subband unit for generating CQI is matched according to a unit for downlink allocation or reporting and is then transmitted in uplink. More specifically, the CQI subband is set by subcarrier unit if a downlink performs allocation or reporting by subcarrier unit. The CQI subband is set by subcarrier group unit if a downlink performs allocation or reporting by subcarrier group unit. Finally, the CQI subband is set by several subcarrier group units if a downlink performs allocation or reporting by binding several subcarrier groups together.

It is advantageous that CQI information size is reduced since CQI transmission imposes a burden on uplink. Therefore, the system may determine if a width of subband of CQI is greater than a unit for allocating frequency band in downlink. In this example, CQI generation unit has a multiple size of allocation or reporting units of downlink.

FIG. 5 illustrates an example of a resource block ('RB') of 3GPP LTE as a frequency unit for allocating a downlink resource, in which a width of subband for CQI generation (i.e., a CQI subband, which is defined as a unit for dividing a frequency band for CQI generation; e.g., dividing the frequency band into a plurality of subcarriers) corresponds to 2 RB. Additionally, the width of subband for CQI subband for CQI generation may be variously set to 1 RB, 3 RB, or 4 RB, according to a condition of the system.

Furthermore, the system may match the boundary for a width of subband and a downlink allocation or report unit if a width of subband as a CQI generation unit becomes equal to a downlink allocation or report unit or becomes a multiple of the downlink allocation or report unit. Specifically, in the current embodiment, a boundary of RB as a unit for allocating a downlink resource may be set to share a boundary of subband-1 as CQI generation unit.

Moreover, adjusting a width of CQI subband is considered an aspect of optimal channel information transmission as follows.

First, a width of CQI subband as a unit for generating CQI transmitted in uplink is N. Second, the CQI is generated as M CQI subbands and selected by Best-M or Peak-M. In this example, an optimal channel information transmitting method is associated with a size of the frequency band allocated in downlink, N*M. Therefore, it is optimal that a size of frequency band to be allocated in downlink in a next time is predicted to match a size of frequency band for generating CQI. The system may perform the previously mentioned operation by adjusting a width of CQI subband if M is fixed.

A method of adjusting the number of subbands for CQI generation and a width of the subband according to another embodiment of the present invention is explained as follows.

First, a width of CQI subband as a unit for generating CQI transmitted in uplink is N. Second, the CQI is generated as M, and CQI subbands are selected by Best-M or Peak-M. In this example, an optimal channel information transmitting method is associated with a size of the frequency band allocated in downlink, N*M. Therefore, it is optimal that a size of frequency band for generating CQI is adjusted if a size of the frequency band to be allocated in downlink is predictable.

Thus, the current embodiment minimizes the difference between a multiplication of the number (M) of subbands for CQI generation and a width (N) of the subband and a size of the frequency band to be allocated to a corresponding UE. In order to minimize the difference the CQI may be generated and transmitted efficiently by a frequency band number adjusting process for adjusting the number (M) of subbands for CQI generation and a frequency bandwidth adjusting process for adjusting a width (N) of subband for CQI generation.

Configuration of UE for performing the CQI generation and transmission methods of the previously mentioned embodiments is explained as follows.

Figure 6:
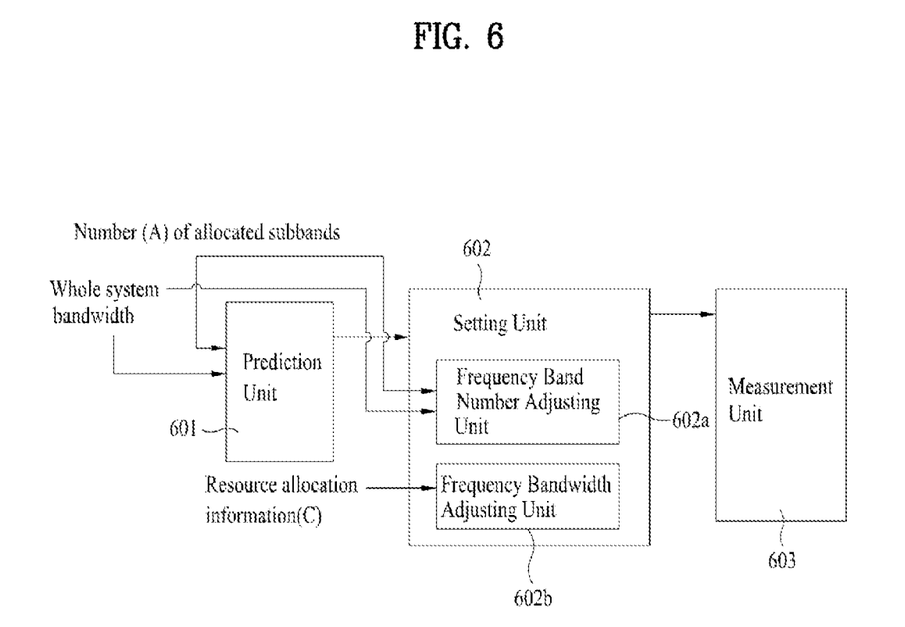
FIG. 6 illustrates a schematic block diagram of a user equipment according to one embodiment of the present invention.

FIG. 6 illustrates a block diagram of a user equipment according to one embodiment of the present invention.

As illustrated in FIG. 6, a UE includes a prediction unit 601, a setting unit 602, and a measurement unit 603.

The setting unit 602 may include two adjusting units distinguished from each other according to a corresponding function. The two adjusting units may include a frequency band number adjusting unit 602a and a frequency bandwidth adjusting unit 602b, respectively.

The respective elements of the UE are explained as follows.

First, the prediction unit 601 performs prediction for a size of frequency band to be allocated to a UE. FIG. 6 illustrates that the prediction unit 601 predicts a frequency band to be allocated to a corresponding UE using number information (A) of subbands allocated in a previous time and information (B) on whole system bandwidth. Additionally, the prediction unit 601 is able to use other information for predicting the frequency band to be allocated to the corresponding UE.

As illustrated in FIG. 6, the prediction unit 601 predicts the number ($M_p$) of subbands to be allocated to the corresponding UE using the number of subbands previously or an average or a weighted average of the subband number previously allocated as the allocated subband number (A). In this example, the prediction unit 601 may additionally consider the entire system bandwidth (B), when predicting the number ($M_p$) of the subbands to be allocated. Specifically, in case that the whole system bandwidth (B) is increased, the prediction unit 601 may predict an increased number ($M_p$) of the subbands to be allocated to the corresponding UE. If the entire system bandwidth (B) is reduced, the prediction unit 601 may predict the reduced number ($M_p$) of the subbands to be allocated to the corresponding UE.

The prediction information, such as, prediction information on the number ($M_p$) of subbands to be allocated, by the prediction unit 601 is delivered to the setting unit 602.

The setting unit 602 may adjust or set the number (M) of subbands for generating CQI and the width (N) of the subband using the prediction information. In this example, the number (M) of subbands is adjusted by the frequency band number adjusting unit 602a. The width (N) of subband is adjusted by frequency bandwidth adjusting unit 602b.

According to one embodiment of the present invention, the setting unit 602 is associated with the process of minimizing a difference between a multiplication (M*N) of the number (M) of subbands for CQI generation and a width (N) of the subband and a size of frequency band allocated to a corresponding UE using the frequency band number adjusting unit 602a and the frequency bandwidth adjusting unit 602b. Specifically, in order to minimize the difference between the multiple of the number (M) of subbands for CQI generation and the width (N) of the subband and the size of the frequency band allocated to the corresponding UE, the frequency band number adjusting unit 602a adjusts the number (M) of subbands for CQI generation, and the frequency bandwidth adjusting unit 602b adjusts the width (N) of the subband for CQI generation.

Therefore, the corresponding setting information is forwarded to the measurement unit 603 after the number (M) and width (N) of the subbands for the CQI generation have been determined.

The measurement unit 603 measures a channel quality according to the number (M) of subbands for the CQI generation and the width (N) of the subband and generates the CQI.

Another embodiment of the present invention adjusts a width of subband for CQI generation according to resource allocation information obtained from a base station and provides a configuration of UE to generate CQI based on the adjusted width of subband.

Figure 7:
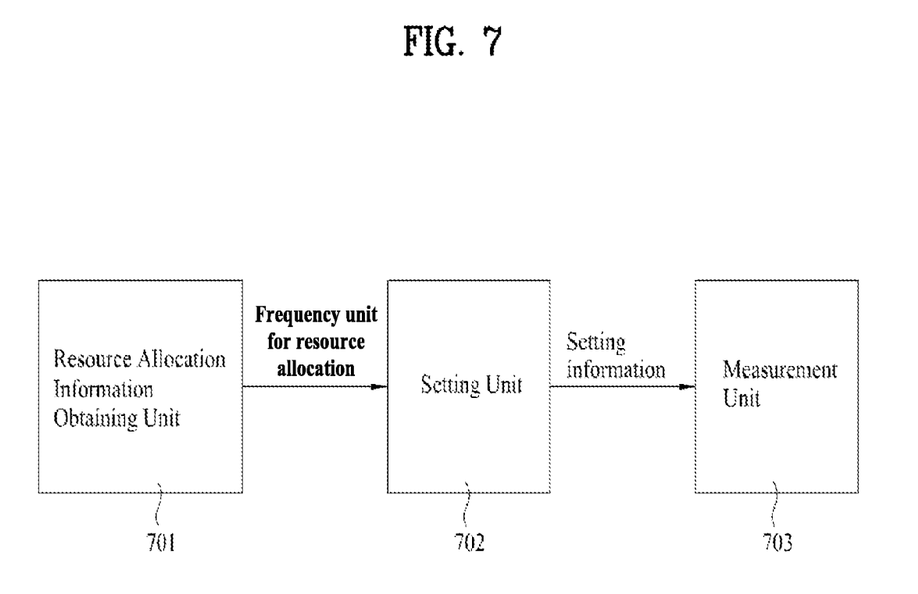
FIG. 7 illustrates a schematic block diagram of a user equipment according to a second embodiment of the present invention.

FIG. 7 illustrates a schematic block diagram of a user equipment according to a second embodiment of the present invention.

As illustrated in FIG. 7, a user equipment (UE) according to a second embodiment of the present invention includes a resource allocation information obtaining unit 701, a setting unit 702, and a measurement unit 703.

First, the resource allocation information obtaining unit 701 obtains information on a unit for allocating a frequency resource to a UE via downlink resource allocation information received from a base station. For example, in a 3GPP LTE system, the resource allocation information obtaining unit 701 may determine if a unit for the base station to allocate a frequency resource (e.g., bandwidth or frequency unit for resource allocation) to each UE is 1 RB, 2 RB, or a specific RB unit, via the resource allocation information provided by the base station.

The resource allocation unit then forwards the obtained information (e.g., bandwidth or frequency unit for resource allocation) to the setting unit 702. The setting unit 702 groups a prescribed number of subcarriers to subbands for generating CQI. In this example, the setting unit 702 sets the width of the subband to a multiple of the unit for the base station to allocate frequency resources to the UEs. In this example, the multiple may be set to 1, or to a value equal to the unit for the base station to allocate the frequency resources to the UEs, such as twice or triple.

Finally, the measurement unit 703 may generate CQI by measuring a channel quality of the corresponding subband using the subband width set in the setting unit 702.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Figure 8:
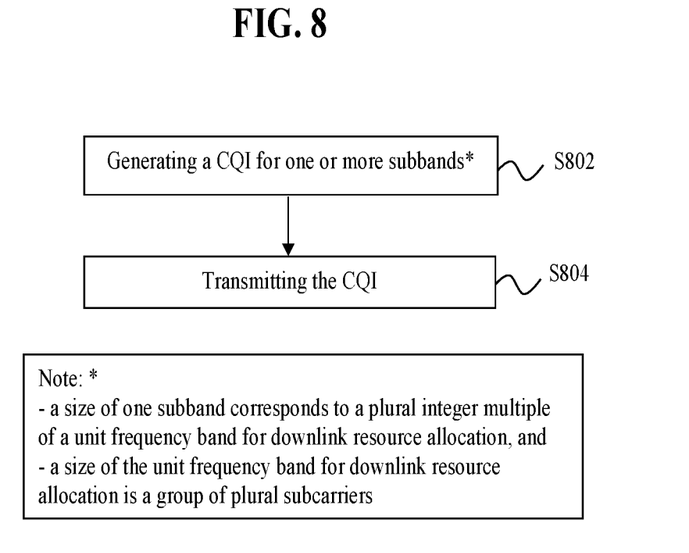
FIG. 8 illustrates a procedure for reporting CQI according to an example of the present invention.

FIG. 8 illustrates a procedure for reporting CQI according to an example of the present invention. As illustrated in FIG. 8, a UE may generate a subband CQI for one or more subbands in a frequency domain (S802), and transmit the subband CQI to a BS. Here, a size of the one subband corresponds to an integer multiple of a size of downlink resource allocation unit and the size of downlink resource allocation unit is an integer multiple of a group of plural subcarriers. Preferably, the size of downlink resource allocation unit may correspond to a plural multiple of the group of plural subcarriers. Preferably, the UE may further transmit a combinatorial index indicating positions of the M subbands, wherein the combinational index is selected among $_NC_M$ combinations, where $_NC_M$ is defined as $$\frac{N!}{M!(N-M)!},$$

where M is integer indicating a number of the one or more subbands, N is integer indicating a number of whole subbands of the entire downlink system bandwidth, and 1≤M<N. Preferably, a number of bits used to represent the combinatorial index may be $\lceil \log_2(_NC_M) \rceil$.

For example, the various embodiments of the present invention are described reference to the 3GPP LTE in generating and transmitting CQI. However, CQI generating method and user equipment are applicable to various systems requiring feedback for downlink channel quality, such as an IEEE 802 series communication method.

In the above description, 'base station' indicates a fixed station communicating with a user equipment in general and may be called such a different terminology as a node-B, a BTS (base transceiver system), and an access point. In the above description, 'user equipment' may be fixed or have mobility, and can be referred to as a terminal, a user terminal (UT), a subscriber station (SS), and a wireless device.

What is claimed is:

1. A method for transmitting channel quality information from a user equipment (UE) in a mobile communication system, the method performed by the UE and comprising:
generating at least one channel quality indicator (CQI) for one or more subbands in a frequency domain;

transmitting the at least one CQI;
wherein a size of one subband of the one or more subbands corresponds to an integer multiple of a unit frequency band for downlink resource allocation,
wherein the integer multiple is an integer having a value of 2 or more, and
wherein the unit frequency band comprises plural subcarriers; and
transmitting a combinatorial index,
wherein the combinatorial index is associated with one of a total number possible combinations $_NC_M$ when M subbands are selected from N subbands, so as to indicate which subbands are selected as the one or more subbands,
where $_NC_M$ is defined as $$\frac{N!}{M!(N-M)!},$$

where M is integer indicating a number of the one or more subbands, N is integer indicating a number or whole subbands of an entire downlink system bandwidth, and 1≤M<N, and
wherein a number of bits used to represent the combinatorial index is $\lceil \log_2(_NC_M) \rceil$.

2. The method according to claim 1, wherein the unit frequency band for downlink resource allocation is a resource block (RB).

3. A user equipment (UE) for transmitting channel quality information in a mobile communication system, the UE comprising:
a measuring unit that generates at least one channel quality indicator (CQI) for one or more subbands in a frequency domain, and
a transmitter that transmits the at least one CQI,
wherein a size of one subband of the one or more subbands corresponds to an integer multiple of a unit frequency band for downlink resource allocation,
wherein the integer multiple is an integer having a value of 2 or more, and
wherein the unit frequency band comprises plural subcarriers,
wherein the transmitter transmits a combinatorial index,
wherein the combinatorial index is associated with one of a total number possible combinations $_NC_M$ when M subbands are selected from N subbands, so as to indicate which subbands are selected as the one or more subbands,
where $_NC_M$ is defined as $$\frac{N!}{M!(N-M)!},$$

where M is integer indicating a number of the one or more subbands, N is integer indicating a number or whole subbands of an entire downlink system bandwidth, and 1≤M<N, and
wherein a number of bits used to represent the combinatorial index is $\lceil \log_2(_NC_M) \rceil$.

4. The UE according to claim 3, wherein the unit frequency band for downlink resource allocation is a resource block (RB).

5. A method for receiving channel quality information from a base station (BS) in a mobile communication system, the method performed by the BS and comprising:
receiving at least one channel quality indicator (CQI) for one or more subbands in a frequency domain;
processing the at least one CQI;
wherein a size of one subband of the one or more subbands corresponds to an integer multiple of a unit frequency band for downlink resource allocation,
wherein the integer multiple is an integer having a value of 2 or more, and
wherein the unit frequency band comprises plural subcarriers; and
receiving a combinatorial index,
wherein the combinatorial index is associated with one of a total number possible combinations $_NC_M$ when M subbands are selected from N subbands, so as to indicate which subbands are selected as the one or more subbands,
where $_NC_M$ is defined as $$\frac{N!}{M!(N-M)!},$$

where M is integer indicating a number of the one or more subbands, N is integer indicating a number or whole subbands of an entire downlink system bandwidth, and 1≤M<N, and
wherein a number of bits used to represent the combinatorial index is $\lceil \log_2(_NC_M) \rceil$.

6. The method according to claim 5, wherein the unit frequency band for downlink resource allocation is a resource block (RB).

7. A base station (BS) for receiving channel quality information in a mobile communication system, the BS comprising:
a receiver that receives at least one channel quality indicator (CQI) for one or more subbands in a frequency domain, and
a processing unit that processes the at least one subband CQI,
wherein a size of one subband of the one or more subbands corresponds to an integer multiple of a unit frequency band for downlink resource allocation,
wherein the integer multiple is an integer having a value of 2 or more, and
wherein the unit frequency band comprises plural subcarriers,
wherein the receiver receives a combinatorial index,
wherein the combinatorial index is associated with one of a total number possible combinations $_NC_M$ when M subbands are selected from N subbands, so as to indicate which subbands are selected as the one or more subbands,
where $_NC_M$ is defined as $$\frac{N!}{M!(N-M)!},$$

where M is integer indicating a number of the one or more subbands, N is integer indicating a number or whole subbands of an entire downlink system bandwidth, and 1≤M<N, and wherein a number of bits used to represent the combinatorial index is $\lceil \log_2({_N}C_M) \rceil$.

8. The BS according to claim 7, wherein the unit frequency band for downlink resource allocation is a resource block (RB).

* * * * *